Z. T. GRAMME.
Magneto-Electric Machine.
No. 218,520. Patented Aug. 12, 1879.
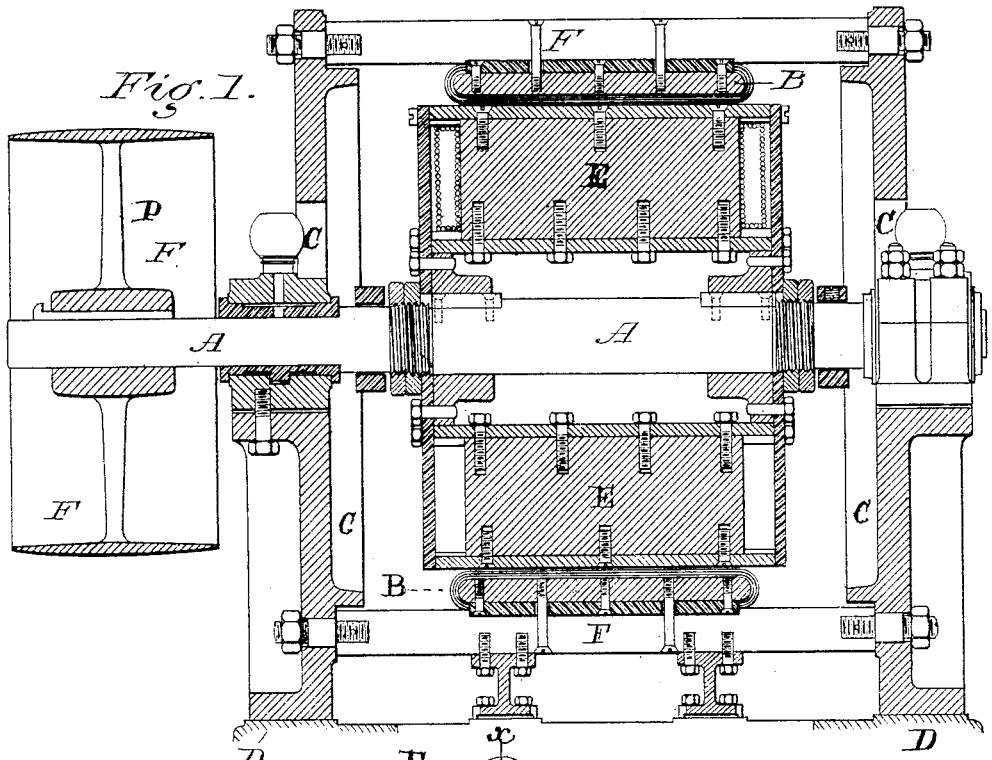
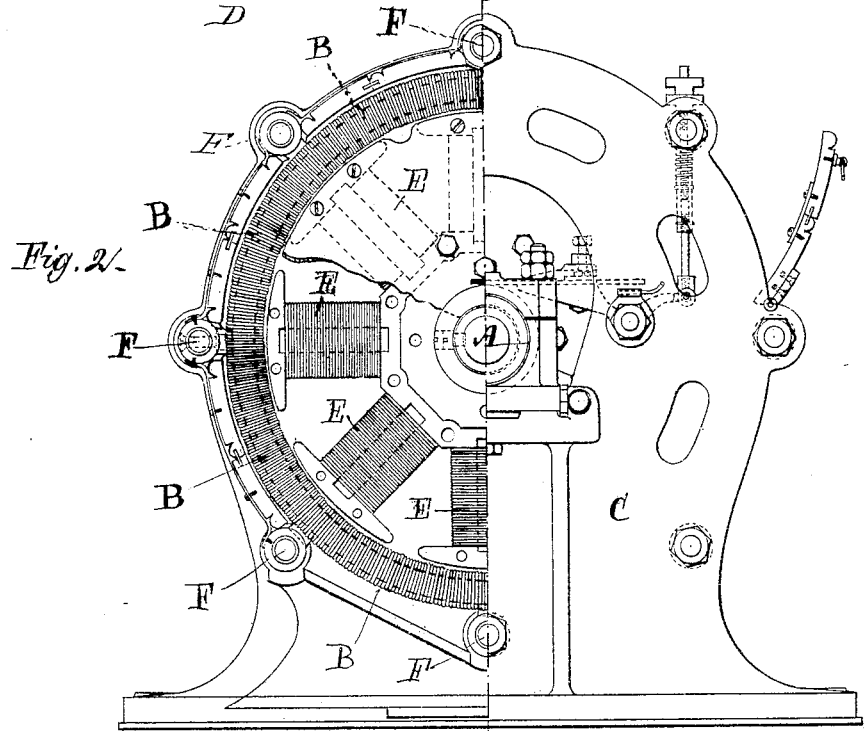

UNITED STATES PATENT OFFICE

ZÉNOBE T. GRAMME, OF PARIS, FRANCE.

IMPROVEMENT IN MAGNETO-ELECTRIC MACHINES.

Specification forming part of Letters Patent No. 218,520, dated August 12, 1879; application filed April 17, 1878.

*To all whom it may concern:*

Be it known that I, ZÉNOBE THÉOPHILE GRAMME, of Paris, in the French Republic, have invented certain new and useful Improvements in Magneto-Electric Machines, of which the following is a full, clear, and exact description, reference being had to the accompanying drawings, in which—

Figure 1 is a vertical section along line $x\,y$ in Fig. 2, and Fig. 2 partly an elevation and partly a transverse sectional view of the machine.

A patent has heretofore been granted to me jointly with E. L. C. D'Ivernois, dated October 17, 1871, No. 120,057, for a magneto-electric machine, in which a ring wound with a continuous strand of wire is combined with one or more electro or permanent magnets. The machine was especially adapted and intended for the production of continuous currents, although by means of modifications described in said patent currents of alternately-opposite polarity could be produced, the currents generated being taken off in all cases by the aid of brushes or other conductors.

The new machine which constitutes the present invention is adapted to and possesses great advantages in the generation of electric currents of alternately-opposite polarity, which can be carried off without the aid of a commutator, brushes, or similar conductors.

It consists, substantially, of a ring of soft iron encircled or wound with copper wire, which latter is divided into a number of sections, and an electro-magnet with a number of single poles, rotating on an axis passing through the center of the ring.

The poles are alternately north and south poles, and consequently as they pass in succession each section of the surrounding coil they produce in that section currents of opposite polarity—that is, when a north pole is passing a positive current flows in one direction, and when a south pole is passing a positive current flows in a direction opposite thereto. Both north and south poles therefore should not act on the same section at the same time, and consequently the number of sections will be the same in number as the poles or a multiple of such number.

As the wire is wound in all the sections in the same direction, it is evident that the positive currents in contiguous sections, when their number is the same as that of the poles, flow in opposite directions. The several sections under the same condition, therefore, in order that the positive currents simultaneously generated in them during any one portion of the revolution of magnets may be carried through the electric light or other circuit in the same direction, are connected with one end of said circuit alternately at their opposite ends; or those sections which at any one time are opposite similar poles may be coupled together, thus forming two series, which may be connected with the circuit, as described for alternate sections; or each section may be connected with the one next to it on both sides at corresponding ends, so that a current in following the course of the wire will, in one section, move in the same direction as the magnets revolve, and in the next one in a direction opposite thereto, and so alternately; and when all the sections are coupled, then the wire is connected with the circuit.

By the different arrangements alternate currents are produced in all the cases; but the currents are different in the tension and quantity.

When the number of sections is a multiple of, say, four times the number of poles, it is evident that each section may be connected independently with the circuit; or the first, second, third, or fourth of each series of four may be coupled with the first, second, third, or fourth, respectively, of the other series of four, in the manner indicated with reference to each section when the number of sections and poles is the same, and the four circuits of tension thus formed may be connected in the same light or other circuit or in different circuits.

In dividing the coil about the iron ring into sections it may not be necessary in all cases to sever it, but the wire for conducting off the alternate currents may be connected with said wire at the proper points to form the section; but in some cases, as when a number a multiple of the number of poles is used, the sections are completely severed.

In coupling the various sections with each other, or connecting them with the light circuit, no brushes or other current-collectors need be used; but the wires are connected directly by binding-screws or other suitable means.

In the drawings, E E E represent a series of electro-magnets arranged radially around and rigidly connected with a central shaft, A, to which rotary movement is imparted by means of a pulley, P. These electro-magnets are separated by equal arcs. They are excited by means of an electric current from any suitable source, as a battery or magneto-electric machine.

B is a fixed ring of soft or malleable iron, covered with copper wire wound around it spirally.

A frame composed of two plates, C C, and a base, D, rigidly connected by means of braces or stays F F, receives and supports the fixed ring and the bearings of the shaft before referred to.

The core of the fixed ring B, instead of being made of a single piece, is or may be composed of iron wire, surrounded by cotton, silk, or other insulating substance.

As before stated, the covering copper wire may be divided into any given number of sections, and the alternating currents (which can be utilized) are taken upon the fixed ring without the aid of a commutator, so that a series of independent currents can be produced at will, or one single current of great intensity, according to the connection of the sections made upon the fixed ring. These currents, being alternating, can be employed for the production of electric light, for tanning, and for all electro-chemical operations which do not require continuity of current.

Machines constructed according to my invention may be made of any dimension.

Although the wire heretofore is described as coiled in the same direction, in order to more clearly explain the invention, and because it is the preferred construction, it is obvious that the coils forming the different sections may be wound in opposite directions by making the proper connections.

It is evident that while the machine produces alternate currents, these currents of alternately-opposite polarity might, by a commutator, be put upon a circuit so as to form a continuous current of the same polarity.

Having thus described my invention and the manner in which the same is or may be carried into effect, what I claim, and desire to secure by Letters Patent, is—

1. The combination, in an organized magneto-electric machine producing alternating currents, with a series of electro-magnets arranged radially around but rigidly connected with a revolving shaft, and excited by means of electric currents of any kind, of a fixed soft ring surrounded with spirally-wound copper wire, divided into a suitable number of sections, and arranged in relation to the shaft which carries the electro-magnets so that the latter shall revolve within the interior of said ring, substantially as herein shown and set forth.

2. The combination, with a series of single-pole electro-magnets revolving with a central axis, radially attached thereto and separated by equal arcs, of a fixed metallic ring wound with conducting-wire and divided into sections, which may be independent or coupled together, as described, the number of said sections corresponding with or being a multiple of the number of aforesaid electro-magnets, substantially as set forth, whereby corresponding sections of the ring are simultaneously and equally affected by the corresponding electro-magnets, and the currents of alternating opposite polarity generated in said sections may be carried off without the aid of a commutator, as specified.

In testimony whereof I have signed my name to this specification before two subscribing witnesses.

Z. T. GRAMME.

Witnesses:
EMILE BARRAULT,
AUG. VINCK.